(12) United States Patent
Weller

(10) Patent No.: US 7,584,971 B2
(45) Date of Patent: Sep. 8, 2009

(54) WORKPIECE CLAMPING SYSTEM

(75) Inventor: Hans-Michael Weller, Marbach (DE)

(73) Assignee: Hainbuch GmbH Spannende Technik (DE)

( * ) Notice: Subject to any disclaimer, the term of this patent is extended or adjusted under 35 U.S.C. 154(b) by 407 days.

(21) Appl. No.: 11/601,069

(22) Filed: Nov. 17, 2006

(65) Prior Publication Data

US 2007/0063454 A1    Mar. 22, 2007

Related U.S. Application Data

(63) Continuation of application No. PCT/EP2005/004983, filed on May 9, 2005.

(30) Foreign Application Priority Data

May 17, 2004    (DE)    ........................ 10 2004 025 256

(51) Int. Cl.
*B23B 31/113*    (2006.01)
(52) U.S. Cl. ................................ 279/93; 279/76; 279/143
(58) Field of Classification Search ................. 279/46.7, 279/67, 68, 76, 89–91, 93, 143; *B23B 31/113*
See application file for complete search history.

(56) References Cited

U.S. PATENT DOCUMENTS

| | | | | |
|---|---|---|---|---|
| 1,418,184 A * | 5/1922 | Trunick | ........................ | 279/93 |
| 1,430,102 A * | 9/1922 | Nell | ........................ | 279/19.3 |
| 1,479,583 A * | 1/1924 | Carey | ........................ | 403/315 |
| 1,526,565 A * | 2/1925 | Redmond | .................... | 279/22 |
| 1,760,310 A * | 5/1930 | Miller | ........................ | 279/89 |
| 1,783,028 A * | 11/1930 | Sheridan | ...................... | 279/93 |
| 2,051,965 A * | 8/1936 | Roth | ........................ | 403/187 |
| 2,057,143 A * | 10/1936 | Gairing | ........................ | 279/93 |
| 2,059,496 A * | 11/1936 | Smith | ........................ | 279/93 |
| 2,103,379 A * | 12/1937 | Oxford | ........................ | 29/558 |
| 2,219,907 A * | 10/1940 | Ross | ........................ | 279/93 |
| 2,231,252 A * | 2/1941 | Chesterman | .................. | 279/93 |
| 2,526,998 A * | 10/1950 | Davis | ........................ | 279/93 |
| 3,011,794 A * | 12/1961 | Vaughn | ........................ | 279/76 |
| 3,085,812 A * | 4/1963 | Rosenthal et al. | .......... | 279/4.06 |
| 3,583,714 A * | 6/1971 | Weltzer et al. | ................. | 279/51 |
| 3,679,220 A * | 7/1972 | Reeves | ........................ | 279/89 |
| 4,939,966 A | 7/1990 | Grund et al. | | |
| 5,240,360 A | 8/1993 | Esser | | |
| 5,423,643 A * | 6/1995 | Suzuki et al. | ................ | 409/232 |
| 5,667,228 A | 9/1997 | Fabris | | |
| 6,176,655 B1 * | 1/2001 | Ostermeier et al. | ..... | 408/239 R |
| 6,276,879 B1 * | 8/2001 | Hecht | ........................ | 409/234 |

FOREIGN PATENT DOCUMENTS

| | | |
|---|---|---|
| DE | 31 30 447 A1 | 2/1983 |
| DE | 36 12 243 A1 | 10/1987 |
| DE | 89 14 083 U1 | 1/1991 |
| DE | 297 22 730 U1 | 2/1998 |
| DE | 101 23 268 A1 | 11/2002 |
| DE | 102 34 210 A1 | 1/2004 |
| DE | 103 23 662 A1 | 12/2004 |
| JP | 07009213 A * | 1/1995 |

* cited by examiner

*Primary Examiner*—Eric A Gates
(74) *Attorney, Agent, or Firm*—Akerman Senterfitt

(57) ABSTRACT

A workpiece clamping system with a machine spindle and a clamping chuck has a bayonet lock with projections. The bayonet lock is closed by insertion and turning. The bayonet lock can be clamped or locked, whereby parts of the projections are movable and exert a locking force on the other projections. A bayonet lock can be placed internally or externally on the workpiece clamping system.

19 Claims, 4 Drawing Sheets

WORKPIECE CLAMPING SYSTEM

FIELD OF APPLICATION AND PRIOR ART

The invention relates to a workpiece clamping system having a machine spindle and a clamping means for clamping a workpiece, the clamping means being fixable to the machine spindle. It is in particular replaceable and ensures a rapid change with respect to the most varied clamping systems or clamping means.

In the case of machining by cutting, the parts to be machined must be fixed to a machine. For this purpose use is made of different clamping devices or clamping systems. The clamping device must correspond to the configuration of the part and the machining task. If different parts are made on the same machine, the specific devices must be changeable rapidly and with a high positioning accuracy. This set problem is solved in the case of so-called machining centres by the replacement of complete device ranges with so-called zero clamping systems, such as are e.g. described in De 297 22 730 U1 and DE 101 23 268 A1. Such zero clamping systems usually have a permanent clamping force or power implemented by spring action. The positioning and introduction of the necessary clamping or retaining force takes place by means of a draw-in nipple. The clamping systems fixed to these zero clamping devices are generally manually operated or are equipped with additional hydraulic or pneumatic connections. The retaining or draw-in force of the individual zero clamping devices is very limited, so that several clamping devices are used for one workpiece clamping range.

In the case of machines where the workpiece is fixed to a machine spindle for machining purposes, it is only possible to fit one quick-change device to the spindle. The retaining forces necessary for machining and the necessary rigidity effects are much higher in such machines, such as e.g. hobbing machines. In addition, power-operated clamping systems cannot be fixed to the commercially available zero clamping systems because there is no interface to a power operation, such as e.g. a cylinder. Therefore the known systems are not suitable for machine tools, which have a power-operated clamping device at the spindle end. In addition, the known zero clamping systems have a very complicated construction.

PROBLEM AND SOLUTION

The problem of the invention is to provide an aforementioned workpiece clamping system, in which the fixing and in particular the replacement of a clamping means on a machine spindle can on the one hand take place rapidly and on the other with high positioning accuracy, whilst giving the system a very simple construction.

This problem is solved by a workpiece clamping system having the features of claim 1. Advantageous and preferred developments of the invention form the subject matter of further claims and are explained in greater detail hereinafter. By express reference the wording of the claims is made into part of the content of the description.

According to the invention a bayonet catch or bayonet lock is constructed on the workpiece clamping system and can be closed by attaching the clamping means to the machine spindle and by a rotary movement or actuation. However, locking means are provided so as to bring about a higher fixing force with a resulting more accurate positioning compared with a conventional bayonet lock. As a result the bayonet lock is locked so as to give a stronger and more release-protected fixing.

Thus, the advantage of a rapid, simple fixing by means of a bayonet lock can be used, which normally does not require tool use. Through the combination with locking by the locking means, it is also possible to ensure that the bayonet lock does not of its own accord become loosened or even released. Moreover as a result of locking, the connection between the clamping means and machine spindle can be given an even more accurate fit and more precise positioning. It is advantageously possible that on locking the bayonet lock the clamping means is drawn or pressed more strongly against or into the machine spindle. Locking should also take place very simply and in an easy to release manner. Advantageous developments of the invention are directed at this. The device also has a simple construction, so as to prevent maintenance work to the greatest possible extent. With the joining of the workpiece clamping system there can be a coupling to a machine power clamping device.

According to an embodiment of the invention, the bayonet lock has on the one hand projections on the clamping means and on the other projections on the machine spindle. These projections correspond to one another in such a way that they permit the function of a per se known bayonet lock. In the fixed state, i.e. when the bayonet lock is functioning, the projections are in engagement with one another by contact faces. These contact faces are inclined to the attachment direction, i.e. the direction in which the clamping means are moved up to or attached to the machine spindle. In the case of a rotating machine spindle said attachment direction is generally the rotation axis, so that the contact faces are also inclined to the machine spindle rotation axis. Advantageously at least one of the projections is movable in a direction inclined to the contact faces or inclined to the attachment direction. It is particularly advantageously movable perpendicular to the attachment direction, i.e. roughly precisely in the radial direction. Thus, through the movement of the projection the corresponding projection in the attachment direction is tightened, which permits the aforementioned intensification of fixing with increased retaining force or power.

The movable projection or the locking means of the bayonet lock are advantageously provided on the machine spindle. This offers the advantage that on the machine spindle it is possible to provide other devices, such as tension tubes or those which can bring about locking. This is frequently the case on machine spindles. It is also possible to fix to in each case one machine spindle different clamping means, particularly chucks, which have a simple construction and no movable parts or projections, without the clamping means requiring modifications with respect to the rigid projections in their part of the bayonet lock.

It is admittedly possible to give a complete projection a movable construction. However, advantageously only part of such a projection is movable, so that the projection is actually fixed and only a part is movable. Such projections can e.g. be made relatively wide and a central part is movable. Thus, in all cases there is a certain bayonet lock retaining force, even if the movable part does not move or fails, because e.g. the mobility is restricted by a dirtying effect or the like.

For the movement of the projection and part thereof it is possible to provide a force, particularly a clamping force, which acts against a clamping ring. Such a clamping ring is advantageously loosely mounted or received and revolves in such a way that it engages on several projections, particularly on all the projections of part of the workpiece clamping system, i.e. so-to-speak on one side of the bayonet lock. Preferably it either runs inside or outside the projections. In a preferred development there are several movable projections or several movable parts, namely one on each projection, all engaging in a similar manner with the same clamping ring.

For clamping purposes a screw can produce the power means between a movable projection or part thereof and the clamping ring. Advantageously the screw is mounted in a corresponding thread in the clamping ring and presses against the projection. Advantageously there is only a single clamping screw for such a clamping ring. If all the movable projections engage on the clamping ring, a very uniformly distributed clamping force is produced, as is generally known with such clamping rings. Such a clamping ring and which also ensures a good centering is e.g. known from DE 103 23 662 A, to which express reference is made here.

It is possible for the bayonet lock part constructed on the clamping means to engage in the machine spindle or project into the same. On the inwardly projecting portion are provided radially protruding projections, which in particular protrude radially outwards. They are surrounded by corresponding projections fixed to the machine spindle and forming the part of the bayonet lock which is constructed on the machine spindle. Preferably and as indicated hereinbefore the movable projections are constructed on the machine spindle.

In an alternative development of the invention a bayonet lock is so constructed that only part of it, particularly the part constructed on the clamping means is rotatable or has to be rotated for fixing purposes. Both during fixing and on locking relative to the machine spindle, the clamping means does not have to be rotated or moved. This has the major advantage that with large, cumbersome clamping means there is no need for a movement and they can consequently be gripped and secured to the machine spindle. This e.g. permits the interlocking of continuous hydraulic lines, which are interconnected by corresponding connections between the machine spindle and clamping means. Moreover further functional passages are possible, if rotation is not necessary.

On the clamping means can be provided a rotary retaining ring which forms the bayonet lock part constructed on the clamping means. The retaining ring can have radially positioned projections with which cooperate corresponding projections on the machine spindle. As stated hereinbefore, the projections engage with one another by contact faces inclined to the attachment direction. Here again the attachment direction advantageously coincides with the machine spindle rotation axis. Here again the locking of the bayonet lock is brought about in that one of the projections or a part thereof is movable in a direction inclined to the contact face, advantageously perpendicular to the attachment direction. Reference should be made to the earlier description for details thereof.

A projection can be moved by a force acting against a revolving force distributing element or a clamping ring, as described hereinbefore. It is also possible to provide a locking screw or the like, which moves the projection or part thereof for locking the bayonet lock. Alternatively to such a clamping ring, it is possible to provide on a force distributing element an inclined face with which it engages on the movable projection. The inclined face is inclined to the movement direction of the movable projection or its part. The angle between the inclined face and the attachment direction is preferably smaller than 90°, advantageously between 45° and 90°. The force distributing element can e.g. be moved in the attachment direction. Through the engagement of the inclined surface on the movable projection the latter is moved, said movement being in the form of a locking of the bayonet lock. As described for the clamping ring, it is advantageous if all the movable projections engage on the force distribution element. Thus, with a movement of the force distribution element it is possible to move all the projections or their parts.

Advantageously in this development of the invention the bayonet lock is provided in the outer area of the workpiece clamping system/machine spindle and clamping means or surrounds the same. A rotary retaining ring can be positioned externally or form part of the circumference of the clamping means or machine spindle. It is advantageously accessible at its outer circumferential surface, so that it can be easily gripped and rotated.

It can be advantageous if the force locking the bayonet lock acts permanently To this end a power or energy storage device can be provided, e.g. in the form of a spring mechanism. By means of a release device and a release force it is possible to cancel out the locking of the bayonet lock for closing or opening purposes. Without this release force the bayonet lock is automatically locked again.

It is advantageously possible to provide for the movable projections or their parts permanently applied restoring forces and e.g. restoring springs can be used for this purpose. The restoring forces press the projections or their parts counter to the locking direction. In this way it is possible to ensure that in the absence of the locking force the movable projections are automatically released. Within the scope of the invention it is possible both to permanently apply the bayonet lock locking force and simultaneously allow the restoring forces to act on the movable projections. However, the restoring forces are overcome by the locking force.

In order to bring about an adequate and very effective positioning and fixing, the bayonet lock is constructed uniformly or symmetrically. For this purpose the projections are uniformly distributed on the machine spindle and/or clamping means. They should have a rotational symmetry in such a way that equally large projections, in certain circumstances with in each case movable parts, are provided with equal angular spacings. Preferably there are in each case three projections displaced by 120° to one another.

To increase the positioning accuracy of the clamping means in the machine spindle, it is possible to provide a conical portion which engages in said machine spindle. It engages there on a corresponding conical face, so that a precise positioning or centering is obtained. As a result of a drawing in force, which can e.g. also be applied by the force or locking of the bayonet lock, said conical faces are pressed into one another. It is also possible to provide between the conical portion and conical face circumferentially distributed rolling members. They can be in the form of balls or rollers, which in certain circumstances can be embedded in an elastic mounting. This is e.g. described in DE 102 34 210 A1, to which express reference is made. This ensures a high positioning accuracy.

It is also possible to provide a snapping or latching device, so that through snapping or latching a predetermined position is provided between the clamping means and work spindle, in which the bayonet lock is closed to such an extent that subsequently locking can take place. Alternatively to such a snapping device marks can be provided for indicating to an operator when the bayonet lock can be locked.

The clamping screw for a clamping ring or a force distributing element can be constituted by a screw with a so-called differential thread. It engages on the one hand with a threaded portion in the clamping ring and on the other with another threaded portion in the movable projection or part. As a result of different pitches or different pitch directions, either there can be an increase in the force or an increase in the operating path covered during each rotation. The thread pitch in the projection can e.g. exceed that in the clamping ring.

These and further features can be gathered from the claims, description and drawings and the individual features, both individually or in the form of sub-combinations, can be implemented in an embodiment of the invention and in other fields and can represent advantageous, independently protectable constructions for which protection is claimed here. The subdivision of the application into individual sections and the subheadings in no way restrict the general validity of the statements made thereunder.

BRIEF DESCRIPTION OF THE DRAWINGS

The invention is described in greater detail hereinafter relative to embodiments of the invention and the attached drawings, wherein show.

DETAILED DESCRIPTION OF THE EMBODIMENTS

Figure 1:
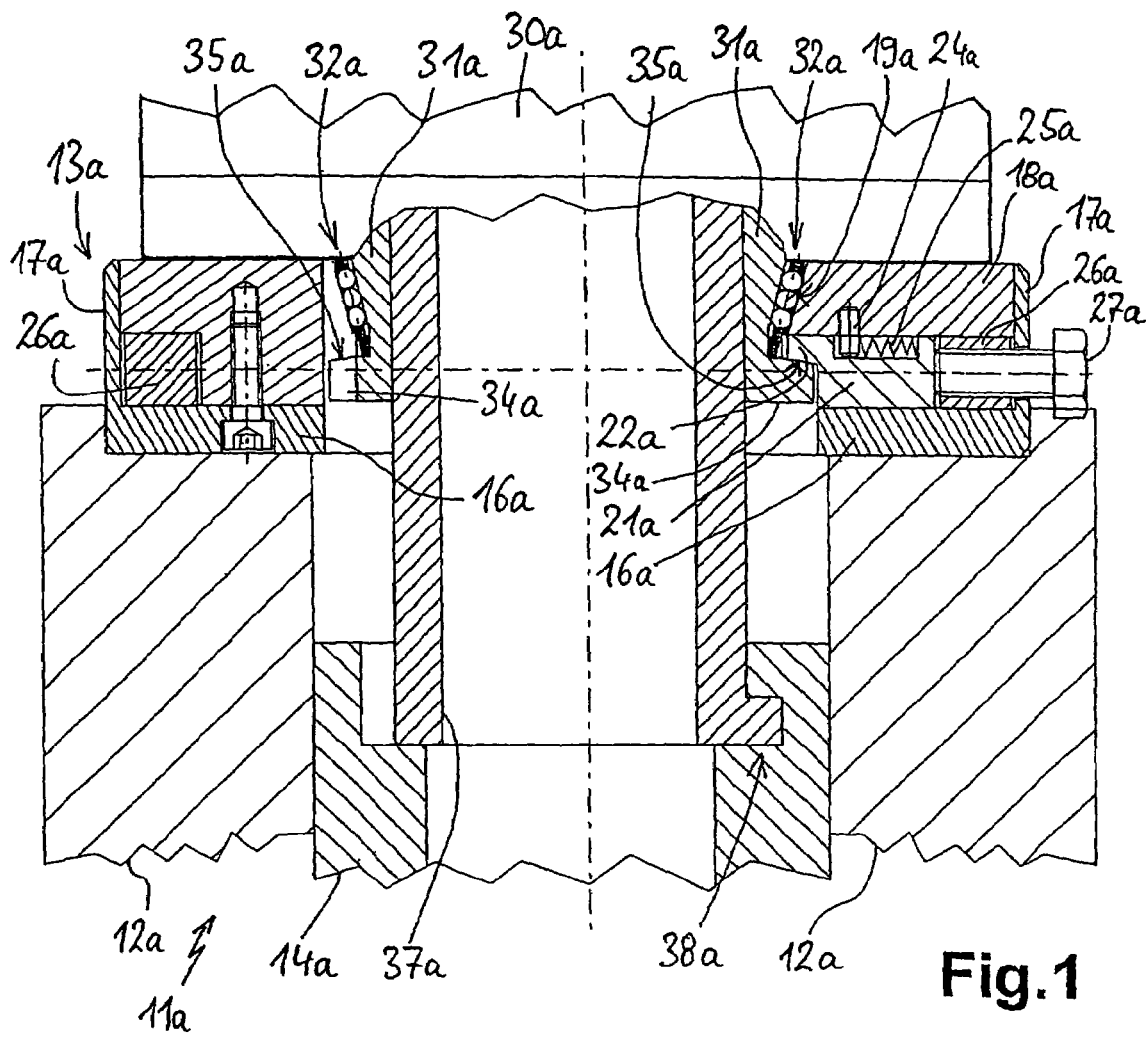
FIG. 1 A lateral section through a first embodiment of a machine spindle with inserted chuck and internal bayonet lock.
Figure 2:
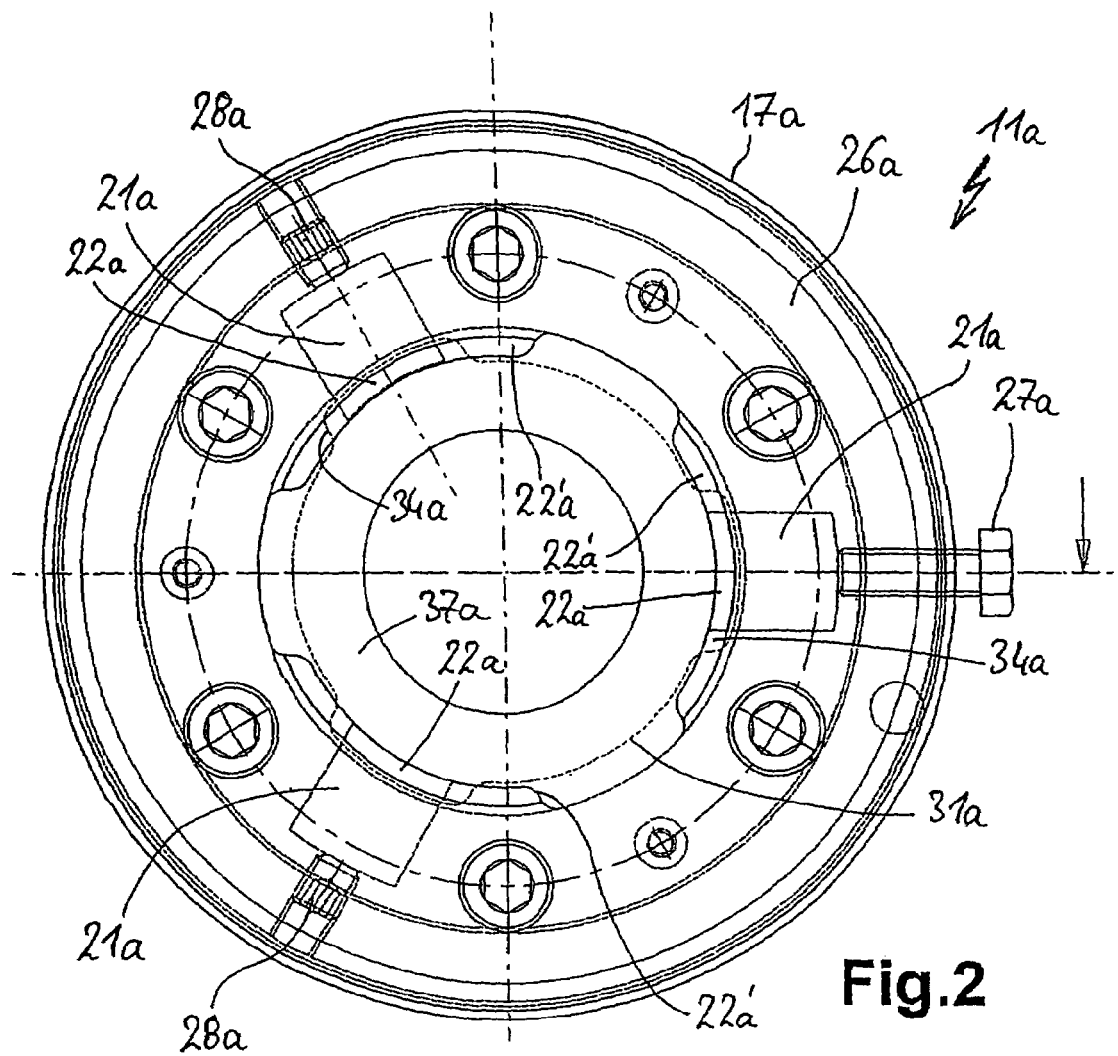
FIG. 2 A section through a view of the arrangement of FIG. 1 from above.

FIGS. 1 and 2 show a conventionally constructed machine spindle 11a having a spindle body 12a to which is connected from the front an attachment area 13a. As is conventionally the case with machine spindles, a tension tube 14a runs in a longitudinal recess of machine spindle 11a in spindle body 12a.

To the machine spindle 11a is attached a chuck 30a, which is not shown here, but corresponds to a conventional chuck such as is e.g. described in DE 102 34 210 A. Chuck 30a has a central conical shoulder 31a, which engages in the attachment area 13a. Around the conical outer face on conical shoulder 31a runs a ball mat 32a, which is known from DE 102 34 210 A.

An area with radially protruding projections 34a is connected at the bottom to conical shoulder 31a. As can be gathered from FIG. 2, there are three projections 34a, which form part of the bayonet lock as yet to be described. The top of the projection 34a is slightly bevelled so as to form the inclined contact faces 34a of the projections of chuck 30a.

An elongated tension tube adapter 37a projects through the conical shoulder 31a. By means of a projection-like tension connection 38a the tension tube adapter 37a engages in the tension tube 14a of machine spindle 11a or corresponding projections. The production or locking of the tension connection 38a takes place in advantageous manner in the same way as for the bayonet lock as yet to be described.

In the attachment area 13a machine spindle 11a has a base plate 16a, which on the outer area has an upright, circumferential edge 17a. From above is inserted or engaged a cover plate 18a, which roughly terminates with edge 17a and forms a closed connection. There are three pawls 21a between base plate 16a and cover plate 18a and have inwardly protruding projections 22a. As is apparent from the plan view of FIG. 2, these projections 22a form a small area of wider projections 22a' forming part of cover plate 18a. It can be seen that the movable projections 22a are positioned roughly centrally on the fixed projections 22a'.

By means of a guide pin 24a and a return spring 25a, which engage in a recess on the top of pawl 21a, there is a guidance of the pawls and they are automatically pressed radially outwards and this will be explained in greater detail hereinafter.

Between base plate 16a and cover plate 18a, a mechanically stable, closed clamping ring 26a passes round the pawls 21a. In a thread in clamping ring 26a there is a clamping screw 27a which is accessible from the outside. Adjusting screws 28a screwed into clamping ring 26a engage on the other two pawls 21a.

Function of the Embodiment of FIGS. 1 and 2

A connection between machine spindle 11a and chuck 30a according to FIGS. 1 and 2 is brought about in the following way:

With the tension tube adapter 37a at the front the chuck 30a is introduced into machine spindle 11a. The ball mat 32a engages with the bearing surfaces 19a on cover plate 18a, which leads to a precise centering and positioning. The projections 34a of chuck 30a pass between and beyond the projections 22a' of machine spindle 11a and this also applies to the tension connection 38a.

The chuck 30a is then turned somewhat to the extent that the projections 34a are positioned precisely centrally to projections 22a or pawls 21a. This means that they simultaneously engage beneath projections 22a'. As projections 34a are much wider than projections 22a, as is illustrated by the broken line representation in FIG. 2, the thus formed bayonet lock is locked in all cases. This applies to the not shown tension connection 38a in the same way. In order to find the precise end position on rotating chuck 30a following insertion into machine spindle 11a, it is possible to provide stops, snapping means or alternatively markings.

During insertion the clamping screw 27a is unscrewed, so that the pawl 21a is pressed outwards against pin 24a by return spring 25a. The same applies to all the pawls 21a, which have similar return springs. For locking the bayonet lock the clamping screw 27a is screwed into the clamping ring 26a and engages with the outside of pawl 21a, so that the latter is pressed radially inwards. The inclined contact faces 35a of projections 22a and 34a brings about a clamping or locking of the connection. So that said locking does not impair the precise positioning or centering of the conical shoulder 31a in machine spindle 11a, the circumferential clamping ring 26a is provided. Through the tightening of clamping screw 27a, clamping ring 26a is drawn outwards to the right. This means that simultaneously by means of adjusting screws 28a it engages with the outsides of the two other pawls 21a and consequently presses them or their projections 22a against the corresponding projections 34a of chuck 30a. This leads to a locking of all three projections 34a of chuck 30a. Said locking also takes place uniformly so that it does not change the centering or positioning of chuck 30a on machine spindle 11a. An adjustment for adapting machine spindle 11a can e.g. be brought about by adjusting screws 28a.

Following the tightening of clamping screw 27a to a certain predetermined force the bayonet lock is not only closed, but also locked. Chuck 30a or conical shoulder 31a is drawn by a small amount further into bearing surface 19a of machine spindle 11a, which further intensifies fixing.

Detailed Description of the Further Embodiments

Figure 3:
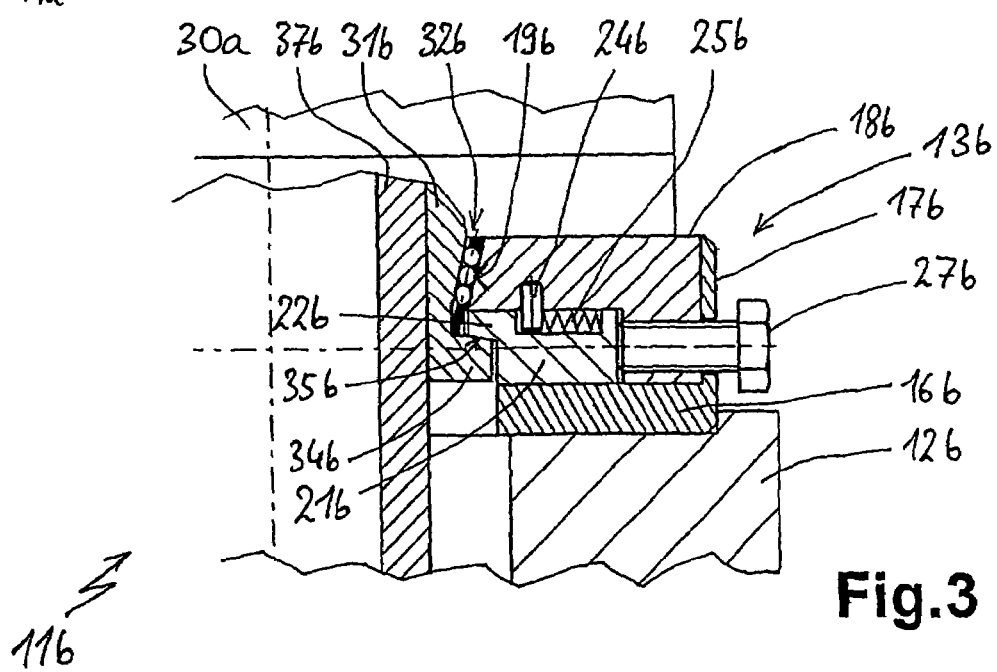
FIGS. 3 to 5 Variants of the bayonet lock in views similar to FIG. 1 in detail form.

FIG. 3 shows in detail form a variant restricted to the attachment area 13b of machine spindle 11b. A differently constructed cover plate 18b is placed on a base plate 16b, constructed in similar manner to FIG. 1, with marginal areas 17b on spindle body 12b. Here there is no separate, free, floating mounted clamping ring. For this purpose cover plate 18b has a downwardly drawn area, where there is a thread for a clamping screw 27b engaging on a pawl 21b. The latter is constructed like that of FIG. 1. In such a construction there is either only a single movable pawl 21b, which is moved by clamping screw 27b and brings about a locking of the bayonet lock at a single location. Alternatively there can be several movable pawls 21b with in each case a clamping screw 27b in a downwardly drawn area. Chuck 30b with conical shoulder 31b and projections 34b have an identical construction to FIG. 1 and this also applies in FIGS. 4 and 5.

Figure 4:
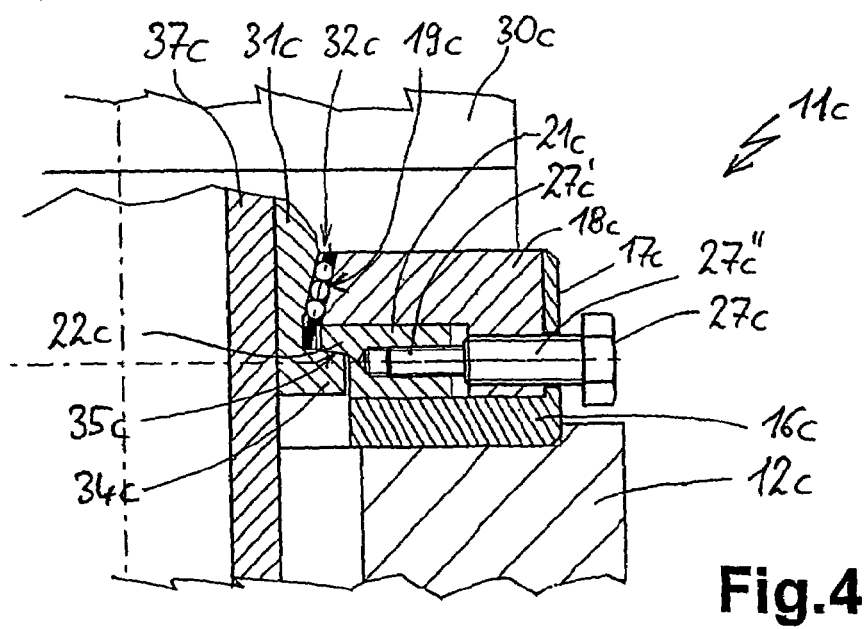

FIG. 4 shows a further alternative construction of attachment area 13c. Compared with FIG. 3 base plate 16c and cover plate 18c have an identical construction. However, movable pawl 21c has a thread smaller than that in cover plate 18c and a different pitch. A clamping screw 27c is screwed into both the threads in cover plate 18c and pawl 21c. It is constructed as a so-called differential screw and has two different threaded areas 27c', 27c". This makes it possible to exert an increased force for locking the bayonet lock or moving the pawl 21c. It also permits the pawl 21c to be drawn outwards in a planned manner even in the case that it jams and the force of a return spring similar to FIGS. 1 to 3 would not be adequate. Here again there is a clamping screw 27c for each movable pawl 21c.

It is also possible to have a construction in which a differential screw is used for a pawl in the case of a clamping ring according to FIG. 1. If the other movable pawls are also connected in fixed manner to the clamping ring, e.g. in that screws, similar to the adjusting screws, firmly engage in the pawls, it is here again possible to bring about a force-caused release of the locking by retracting all the pawls.

Figure 5:
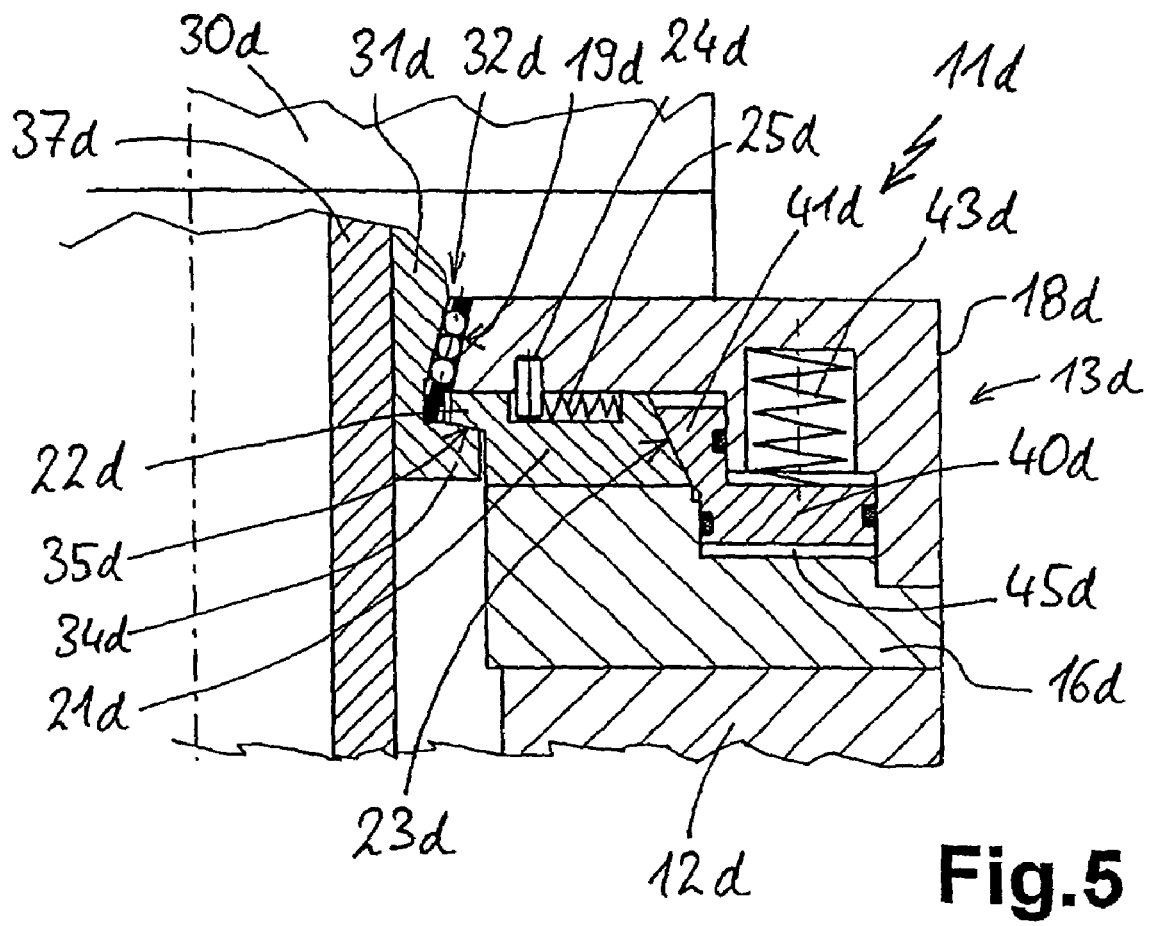

In a further alternative according to FIG. 5 base plate 16d and cover plate 18d once again form a type of closed housing for the attachment area 13d. The movable pawls 21d once again have guide pins 24d and return springs 25d. On the right-hand outside they have inclined sides 23d, which become wider in the downwards direction.

A locking element 40d is provided for moving or locking pawls 21d. It has an inclined portion 41d engaging on the inclined side 23d of pawl 21d. By means of a compression spring 43d locking element 40d is pressed downwards, so that inclined portion 41d runs downwards on inclined side 23d and presses same radially inwards for locking the bayonet lock on projections 22d and 34d. Obviously the compression spring 43d must have a relatively strong construction.

For releasing the locking effect between locking element 40d and base plate 16d is provided a pressure chamber 45d into which can be introduced a fluid, e.g. compressed air or hydraulic fluid. This fluid forces the locking element 40d upwards and consequently permits a movement of pawl 21d in the radially outwards direction brought about by return spring 25d.

In place of compression spring 43d and pressure chamber 45d use can be made of other clamping means. It is e.g. possible from above to screw a screw through cover plate 18d and press the locking element 40d downwards. This screw can also be constructed like the differential screw of FIG. 4 so as to bring about a movement of locking element 40d in both the upwards and downwards direction.

Figure 6:
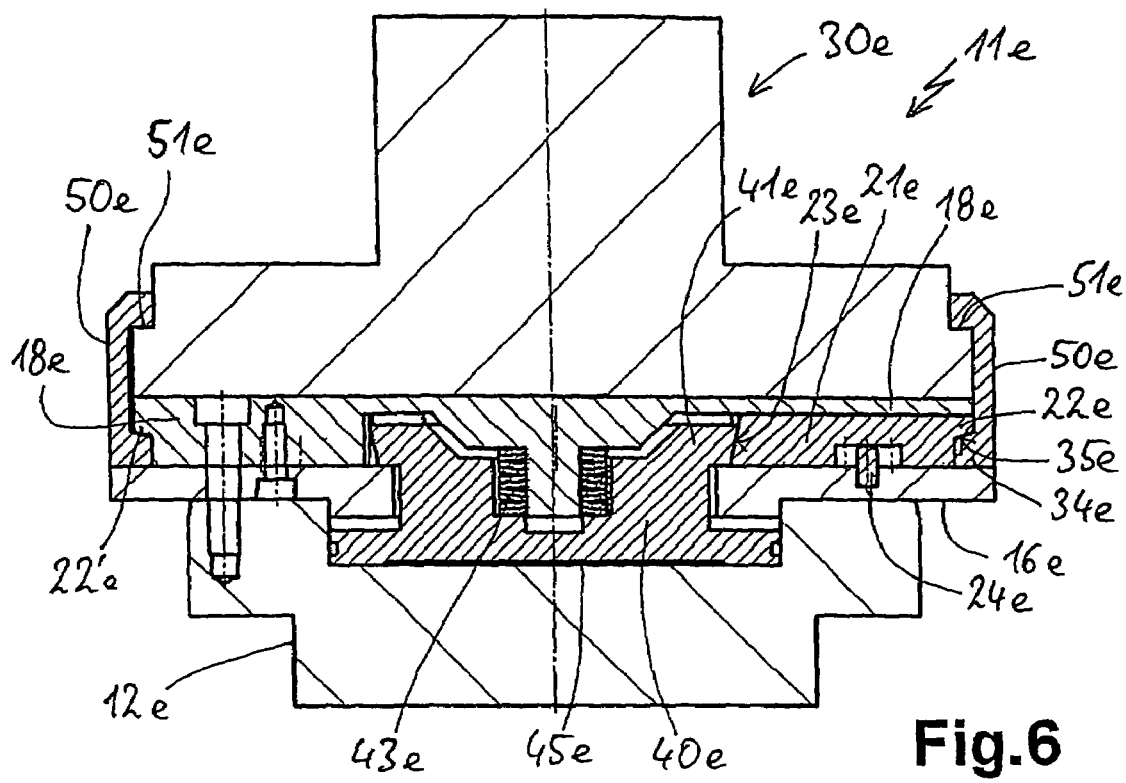
FIG. 6 A variant of the arrangement of FIG. 1 with external bayonet lock and internal locking.

FIG. 6 shows a fundamentally different construction of a bayonet lock. A chuck 30e is attached to a spindle body 12e of a machine spindle 11e, which has no inner tension device. Once again the spindle body 12e has a mounted base plate 16e closed by a cover plate 18e. Both are screwed, as can be seen to the left in FIG. 6. Between base plate 16e and cover plate 18e there are movable pawls 21e, advantageously three uniformly distributed pawls. They are guided by a guide pin 24e and return springs can be provided, as in the previous embodiments.

The pawls 21e have radially outwardly protruding projections 22e, which have downwardly directed, inclined contact faces 35e, with inclined sides 23e on the radially inner end.

Centrally in attachment area 13e is mounted a locking element 40e having inclined portions 41e, which engage on the inclined sides 23e of pawl 21e. If locking element 40e is forced downwards by compression spring 43e, i.e. into machine spindle 11e, the inclined portion 41e, via inclined side 23e, presses the pawl 21e radially outwards. Resetting of the locking element 40e can e.g. take place by means of a pressure chamber 45e, as described relative to FIG. 5. Alternatively other resetting means can be provided.

Chuck 30e is widened in its lower area and has a circumferential bayonet ring 50e, which is circumferentially completely closed and mounted in rotary manner. It can engage by projections 51e over chuck 30e.

At the lower end of bayonet ring 50e are formed projections 34e, corresponding to the moving pawls 21e. Projections 34e have inclined contact faces 35e, on which can correspondingly engage projections 22e of pawls 21e. With respect to the parts forming the bayonet lock, the arrangement according to FIG. 6 is constructed similar to that of FIG. 2. For mounting chuck 30e on spindle body 12e bayonet ring 50e is brought into a position in which with its projections 34e is runs past corresponding projections 22e' of spindle body 12e. Through the rotation of bayonet ring 50e, its projections 34e engage behind projections 22e' and projections 22e on pawls 21e. If for locking purpose pressure is drawn off from pressure chamber 45e, locking element 40e is forced downwards and simultaneously pawls 21e are forced outwards. Through the outward movement of pawls 21e a locking of the bayonet lock takes place.

Figure 7:
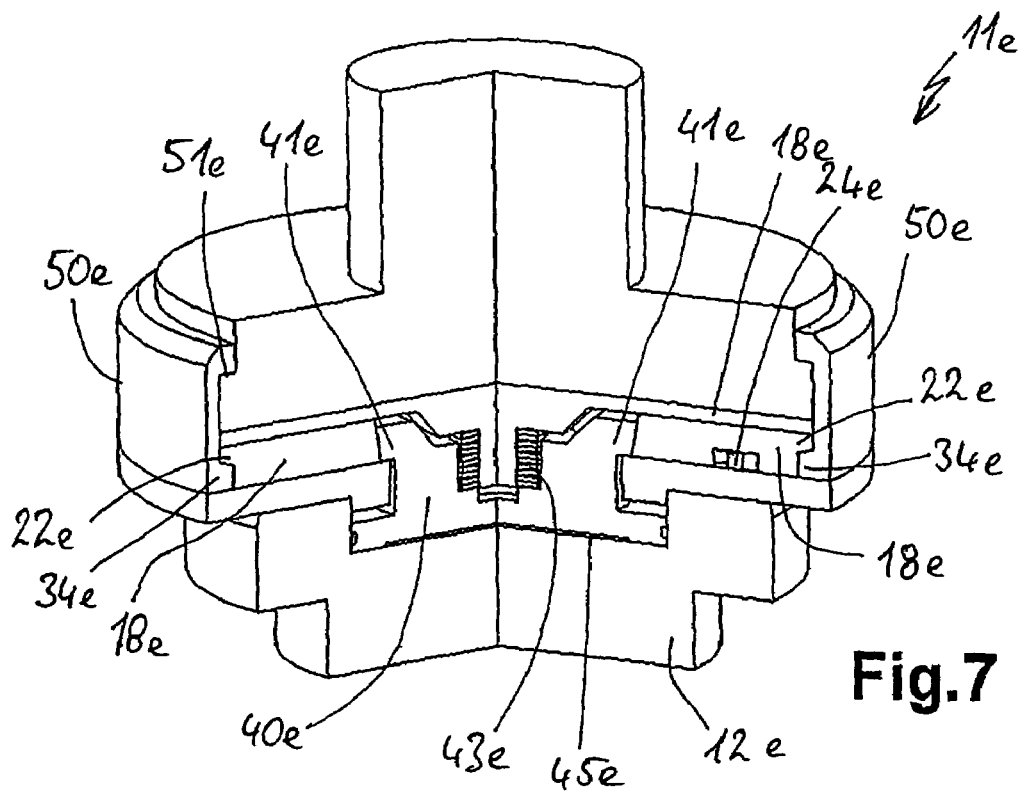
FIG. 7 An inclined view of the arrangement of FIG. 6.

The circumferential bayonet ring 50e can be particularly clearly seen in the inclined view of FIG. 7. The section in FIG. 7 also takes place along two movable pawls 21e, the guide pin 24e only being visible for the right-hand pawl.

Similar to the projections according to FIG. 2, the projections 34e of FIGS. 6 and 7 are limited to a specific inscribed angle range. This also applies to projections 22'e and movable parts 22'.

The arrangement of FIGS. 6 and 7 offers the advantage that for producing the bayonet lock chuck 30e does not have to be rotated relative to machine spindle 11e and spindle body 12e and instead only bayonet ring 50e is turned. This makes it possible, e.g. similar to the screw coupling shown to the left, to have continuous hydraulic lines or the like which are connected on installation. Thus, a chuck 30e can be coupled not only mechanically to machine spindle 11e, but simultaneously can be provided with continuous functions or controls.

The invention claimed is:

1. A workpiece clamping system with a machine spindle and with clamping means for clamping a workpiece, said clamping means being attachable and fixable to said machine spindle, and a bayonet lock for fixing said clamping means through an attachment movement and a rotary movement of said bayonet lock, said bayonet lock being lockable by locking means for release-protected fixing, wherein said bayonet lock has clamping means projections on said clamping means and machine spindle projections on said machine spindle and wherein said projections are provided with contact faces which are inclined to an attachment direction of said clamping means on said machine spindle, wherein said clamping means projections and said machine spindle projections in a fixed state of said workpiece clamping system are in engagement with said contact faces, and wherein, in said fixed state, at least one of said projections is movable in a direction inclined to said contact faces.

2. The workpiece clamping system according to claim 1, wherein said movable projection is movable in a direction perpendicular to said attachment direction and wherein said movable projection or said locking means are provided on said machine spindle.

3. The workpiece clamping system according to claim 1, further comprising a loosely received, revolving clamping ring, and wherein one of said projections is movable by a force against said clamping ring.

4. The workpiece clamping system according to claim 3, wherein said clamping ring is closed and has a stable construction, wherein there are provided several of said movable projections engaging all against said clamping ring.

5. The workpiece clamping system according to claim 3, further comprising a clamping screw in said workpiece clamping system for exerting a force between one of said movable projections and said clamping ring.

6. The workpiece clamping system according to claim 5, wherein said clamping screw is mounted in said clamping ring and presses against one of said movable projections.

7. The workpiece clamping system according to claim 6, wherein said clamping screw has a differential thread and is screwed in said clamping ring and in said movable projection, wherein a pitch of a screw thread engaging in said projection is greater than a pitch of a screw thread engaging in said clamping ring.

8. The workpiece clamping system according to claim 1, wherein said clamping means projections are radially protruding and are surrounded by said machine spindle projections.

9. The workpiece clamping system according to claim 8, further comprising a loosely received, revolving clamping ring, wherein said clamping ring passes round said machine spindle projections.

10. The workpiece clamping system according to claim 1, wherein said bayonet lock is constructed in such a way that exclusively one part of said bayonet lock being provided on said clamping means is rotatable for fixing purposes, and wherein apart from that a fixing and locking of said clamping means on said machine spindle is free of rotation or movement.

11. The workpiece clamping system according to claim 10, further comprising a rotatable retaining ring on said clamping means, said retaining ring being part of said bayonet lock and having radially directed projections, wherein said radially directed projections in a fixing state cooperate with radially protruding projections on another part of said workpiece clamping system, said projections engaging on one another with contact faces, wherein said contact faces are inclined to said attachment direction.

12. The workpiece clamping system according to claim 11, further comprising a circumferential force distributing element, wherein said movable projection is movable by a force acting counter to said circumferential force distributing element.

13. The workpiece clamping system according to claim 12, wherein there are several of said movable projections engaging all against said force distributing element.

14. The workpiece clamping system according to claim 12, wherein said force distributing element engages with an inclined face on one of said movable projections being inclined by an angle between 45° and somewhat less than 90° to said movement direction of said movable projection, wherein through movement of said force distributing element along a longitudinal direction of said machine spindle said at least one movable projection engaging on said inclined face is moved for locking said bayonet lock.

15. The workpiece clamping system according to claim 14, wherein all said movable projections engage on said force distributing element.

16. The workpiece clamping system according to claim 1, wherein a force for locking said bayonet lock is permanently applied.

17. The workpiece clamping system according to claim 16, wherein said force for locking said bayonet lock is produced by an energy or force storage device.

18. The workpiece clamping system according to claim 16, further comprising a release device with a release force for canceling said force for locking said bayonet lock, thereby releasing said bayonet lock.

19. The workpiece clamping system according to claim 17, wherein said energy or force storage device is a spring mechanism.

* * * * *